(12) United States Patent
Sofos et al.

(10) Patent No.: US 9,137,559 B2
(45) Date of Patent: Sep. 15, 2015

(54) APPARATUS AND METHOD FOR PROVIDING MEDIA PROGRAMMING

(75) Inventors: James Sofos, Aurora, IL (US); Lee Chow, Naperville, IL (US); David Piepenbrink, Chicago, IL (US)

(73) Assignee: AT&T INTELLECTUAL PROPERTY I, LP, Atlanta, GA (US)

(*) Notice: Subject to any disclaimer, the term of this patent is extended or adjusted under 35 U.S.C. 154(b) by 446 days.

(21) Appl. No.: 13/310,937

(22) Filed: Dec. 5, 2011

(65) Prior Publication Data

US 2013/0145403 A1 Jun. 6, 2013

(51) Int. Cl.
*H04N 7/18* (2006.01)
*H04N 21/41* (2011.01)
*H04N 21/4363* (2011.01)
*H04N 21/442* (2011.01)

(52) U.S. Cl.
CPC ....... *H04N 21/4122* (2013.01); *H04N 21/4126* (2013.01); *H04N 21/43637* (2013.01); *H04N 21/44227* (2013.01)

(58) Field of Classification Search
CPC .......... H04N 21/4122; H04N 21/4126; H04N 21/43637; H04N 21/44227
USPC .............................................. 725/62, 74–85
See application file for complete search history.

(56) References Cited

U.S. PATENT DOCUMENTS

| | | | |
|---|---|---|---|
| 8,014,768 B2 | 9/2011 | Ackley | |
| 2004/0073915 A1* | 4/2004 | Dureau | 725/9 |
| 2004/0158855 A1* | 8/2004 | Gu et al. | 725/39 |
| 2005/0015812 A1* | 1/2005 | Banet et al. | 725/126 |
| 2005/0114891 A1* | 5/2005 | Wasenius | 725/62 |
| 2005/0282582 A1* | 12/2005 | Slotznick | 455/557 |
| 2007/0019110 A1* | 1/2007 | Cho | 348/554 |
| 2007/0124777 A1* | 5/2007 | Bennett et al. | 725/78 |
| 2007/0220562 A1* | 9/2007 | Janssen et al. | 725/81 |
| 2008/0209487 A1* | 8/2008 | Osann et al. | 725/109 |
| 2009/0031375 A1* | 1/2009 | Sullivan et al. | 725/105 |
| 2009/0193474 A1* | 7/2009 | Stein | 725/82 |
| 2009/0222874 A1* | 9/2009 | White et al. | 725/118 |
| 2010/0083338 A1* | 4/2010 | Chiang | 725/139 |
| 2010/0131989 A1* | 5/2010 | Casimere | 725/62 |
| 2010/0153985 A1* | 6/2010 | Dey | 725/25 |
| 2011/0085526 A1 | 4/2011 | Joseph et al. | |
| 2011/0145581 A1* | 6/2011 | Malhotra et al. | 713/171 |
| 2011/0283333 A1* | 11/2011 | Ukkadam | 725/131 |
| 2011/0292300 A1* | 12/2011 | Nagara et al. | 348/734 |
| 2012/0079541 A1* | 3/2012 | Pan | 725/62 |

* cited by examiner

*Primary Examiner* — Jason Salce
(74) *Attorney, Agent, or Firm* — Guntin & Gust, PLC; Ralph Trementozzi (57) ABSTRACT

A system that incorporates teachings of the present disclosure may include, for example, detecting at a mobile communication device a presence of a set-top box communicatively coupled to a display device, negotiating a transfer of operational control of the display device from the detected set top box to the mobile communication device, receiving a media stream at the mobile communication device by way of wireless communication with a media source, and transmitting a selected media program from the mobile communication device to the display device by way of a wireless communication link between the mobile communication device and the detected set-top box for presentation at the display device without decoding of the selected media program being performed by the set top box. Other embodiments are disclosed.

12 Claims, 6 Drawing Sheets

APPARATUS AND METHOD FOR PROVIDING MEDIA PROGRAMMING

FIELD OF THE DISCLOSURE

The present disclosure relates generally to an apparatus and method for providing media programming by way of a mobile communication device.

BACKGROUND

Media content is frequently experienced by consumers via devices such as computers, televisions, radios, and mobile electronics. Media content is frequently delivered by service providers, who send the media content, such as television, radio, and video programming, directly to consumers for enjoyment at their physical locations. Programming is often transmitted to consumers in protected formats that must be unlocked and decoded by proprietary methods prior to presentation at a consumer's device. Modern communication networks benefit from interconnectivity between consumers and various communication devices. As network capabilities expand, these interconnections provide new opportunities to enhance abilities to enjoy media content.

DETAILED DESCRIPTION

The present disclosure describes, among other things, illustrative embodiments for providing media programming. In one embodiment, a mobile communication device can be operable to provide a media program at a display device. Other embodiments are contemplated by the present disclosure.

One embodiment of the present disclosure includes a mobile communication device having a memory coupled to a processor. The processor can be operable to receive a media stream at the mobile communication device by way of wireless communication with a media source. The processor can also be operable to decode a first media program from the received media stream and to present the decoded first media program at a display at the mobile communication device. The processor can further be operable to detect a presence of a display device. The processor can be operable to establish a wireless communication link to the detected display device. The processor can also be operable to receive a user selection of a second media program from the detected display device. The processor can further be operable to decode at the mobile communication device the selected second media program from the received media stream. The processor can be operable to the decoded selected second media program from the mobile communication device to the detected display device by way of the wireless communication link for presentation at the display device without decoding of the selected second media program being required at the display device.

One embodiment of the present disclosure includes a computer-readable storage medium including computer instructions, which, when executed by a processor, can cause the processor to detect at a mobile communication device a telephony communication session initiated from a second communication device over a wireless communication network. The computer instructions can also cause the processor to receive at the mobile communication device a media stream over the wireless communication network. The computer instructions can further cause the processor to detect a presence of a display device by radio frequency identification. The computer instructions can cause the processor to establish a wireless communication link to the detected display device, to present by way of the wireless communication link a user interface at the detected display device for program selection from the receive media stream, and to receive a selection of a media program from the detected display device. In turn, the computer instructions can also cause the processor to transmit the selected media program from the mobile communication device to the detected display device by way of the wireless communication link for presentation at the display device without requiring decoding of the selected media program at the display device.

One embodiment of the present disclosure includes a method including detecting at a mobile communication device a presence of a set-top box communicatively coupled to a display device. The method can also include negotiating a transfer of operational control of the display device from the detected set top box to the mobile communication device. The method can further include receiving a media stream at the mobile communication device by way of wireless communication with a media source. The method can include transmitting a selected media program from the mobile communication device to the display device by way of a wireless communication link between the mobile communication device and the detected set-top box for presentation at the display device without decoding of the selected media program being performed by the set top box.

Figure 1:
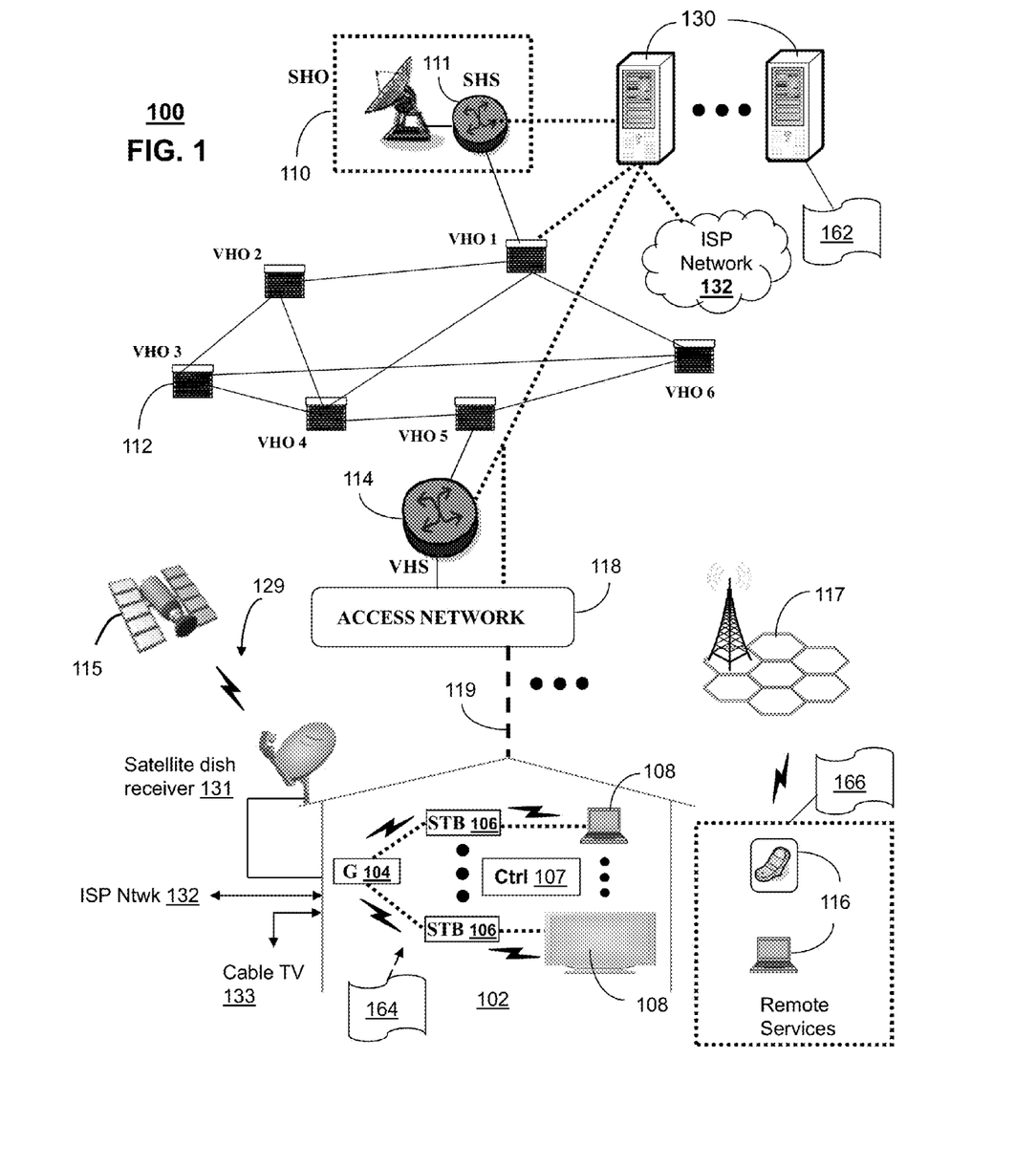
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. Communication system 100 can also provide for all or a portion of the computing devices 130 to function as a media server device 130. The media server device 130 can use common computing and communication technology to perform function 162, which includes among things, providing media content to a consumer by way of a mobile communication device 116. The media server device 130 can provide a media stream to a mobile communication device 116. The media communication device 116 can, in turn, decode a media program from the media stream and present the decoded media program at the mobile communication device 116. The mobile communication device 116 can also detect a media device 108, such as a television, and establish a wireless communication link with the media device 108. The mobile communication device 116 can present a user interface at the media device 108 and can receive a user selection of a media program at the user interface of the media device 108. The mobile communication device 116 can, in turn, decode the selected media program from the media stream and transmit the decoded media program to the media device 108 by way of the wireless communication link. The mobile communication device 116 can also detect a set-top box 106 that is communicatively coupled to the media device 108. The mobile communication device 116 can establish a wireless communication link with the set-top box 106. The mobile communication 116 can transmit a decoded media program to the set-top box 106 by the wireless communication link.

The IPTV media system 100 can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or mobile communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other wide area wireless network technologies can be used by the exemplary embodiments.

Figure 2:
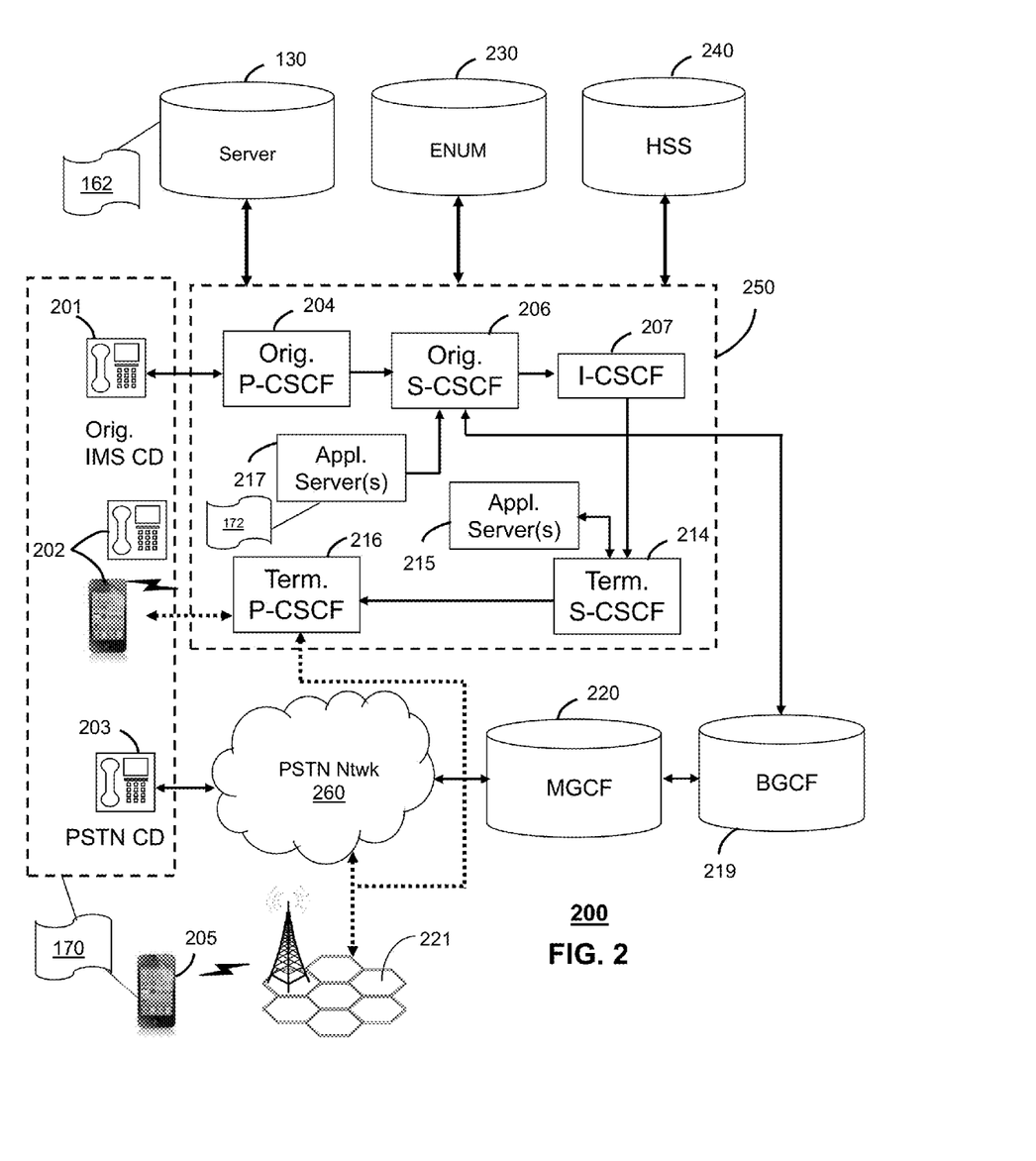

FIG. 2 depicts an illustrative embodiment of a communication system 200 employing Internet Protocol Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

Communication system 200 can include or otherwise be coupled to the media server device 130 of FIG. 1 for purposes similar to those described above. The communication system 200 can include or otherwise be coupled to a mobile communication device 116 and/or a media processor 108 of FIG. 1 for purposes similar to those described above. It is further contemplated by the present disclosure that the media server device 130 and/or the mobile communication device 116 and/or the media processor 108 can perform the function 162 and thereby provide media content for subscribers associated with CDs 201, 202, 203, and 205. CDs 201, 202, 203, and 205 can be adapted with software to perform function 170 to utilize and integrate with the media content application performed by the media server device 130 and/or the mobile communication device 116 and/or the media processor 108. It is further contemplated that the media server device 130 can be an integral part of the application server(s) 217, where the application server(s) 217 performs function 172, which can be substantially similar to function 162 and adapted to the operation of the IMS network 250.

Figure 3:
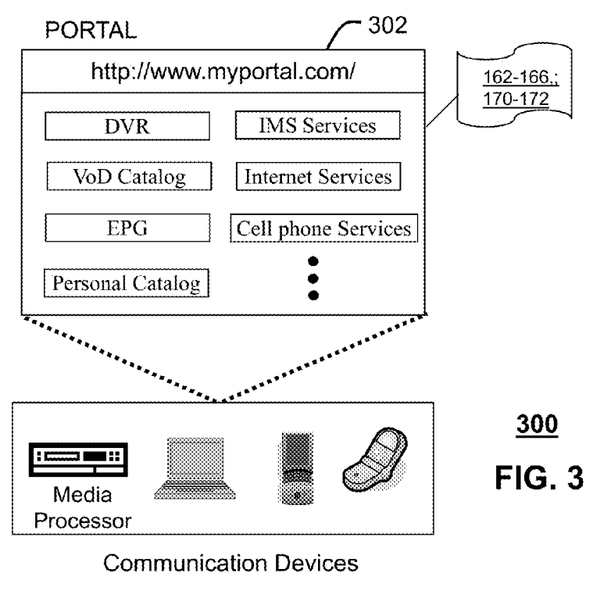
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
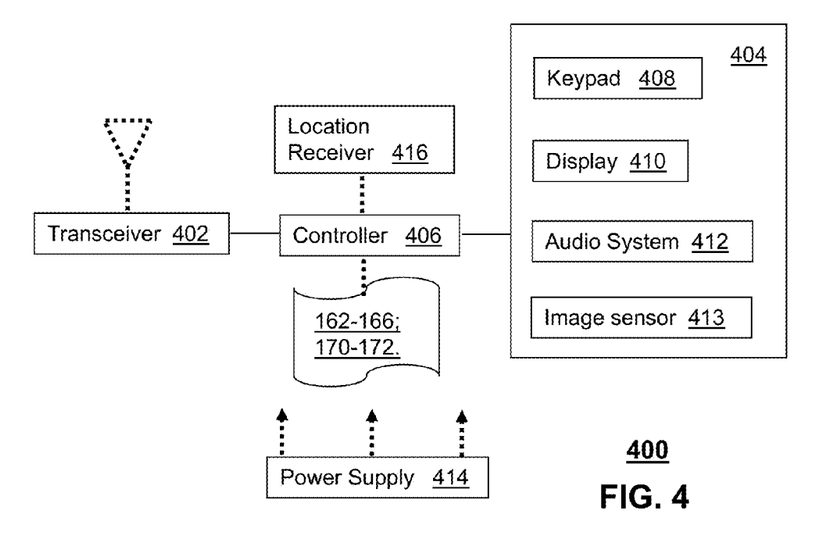
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support wireless high-definition multimedia interface (HDMI). The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The communication device 400 can use the transceiver 402 to detect the presence of a device by radio frequency identification (RFID). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the mobile communication devices 116 of FIG. 1, as well as the IMS CDs 201-202 and PSTN CDs 203-206 of FIG. 2. It will be appreciated that the communication device 400 can also represent other common devices that can operate in communication systems 100-200 of FIGS. 1-2 such as a gaming console and a media player.

Figure 5:
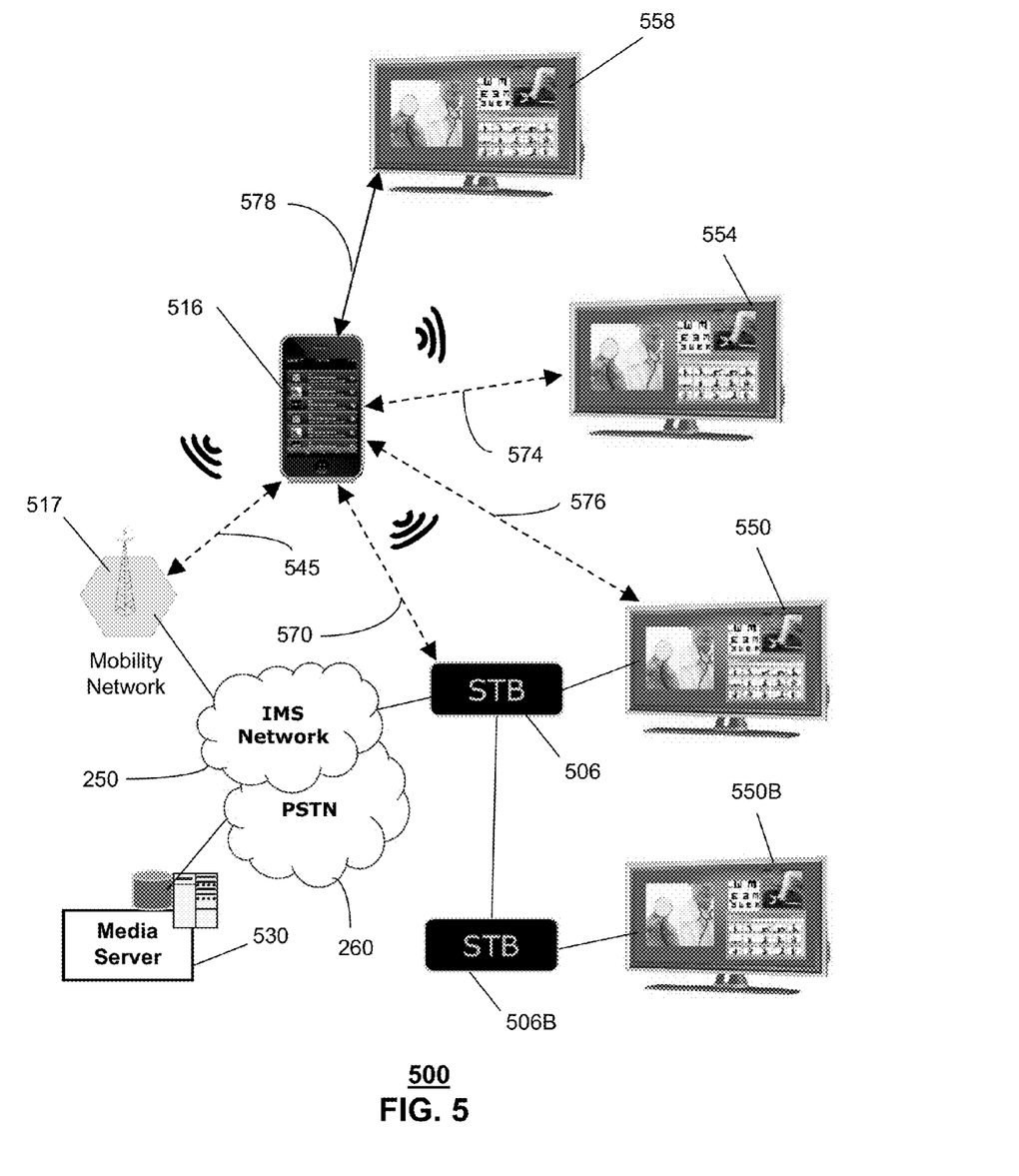
FIG. 5 depicts an illustrative embodiment of a communication system.

FIG. 5 depicts an illustrative embodiment of a communication system 500 for providing media content. System 500 can be overlaid or operably coupled to communication systems 100-200 as another representative embodiment of communication systems 100-200. System 500 can include a media server device 530 in communication with a packet switched network such as IMS network 250. The media server device 530 can be in communication with a media processor device 506, such as set-top box, that are further in communication with a media device 550, such as a television. The media server device 530 can provide media content, by way of a media stream, to the media processor device 506.

The media processor device 506 can further be in communication with satellite media processor devices 506B to form a local network of media processor devices 506 and 506B. The satellite media processor device 506B can be coupled to another media device 550B and can receive media content streamed from the media server device 530 or stored on the media processor device 506.

A mobile communication device 516 can be communicatively coupled to the communication system 500 in several ways. The mobile communication device 516 can communicate with the IMS network 250 through a base station 517 of a mobility network. The mobile communication device 516 can also communicate with the PSTN network 260 through the base station 517 of the mobility network. The mobility communication device 516 can communicate to the mobility network through a cellular communication technology link 545. The mobile communication device 516 can receive streamed media content from the media server device 530 through the IMS network 250, the mobility network 517, or the cellular communication technology link 545.

The mobile communication device 516 can also communicate with a media device 554 by way of a wireless communication link 574 or with a media device 558 by way of a wired communication link 578. The wireless or wired communication links 574 and 578 can be high-definition multimedia interface (HDMI) links. The mobile communication device 516 can use a communication link 574 with a media device 554 to transmit media content for presentation on the media device 554. The mobile communication device 516 can also communicate by a wireless or wired communication link 576 with a media device 550 that is connected to a media processor device 506, such as a set-top box. The mobile communication device 516 can also communicate with a media processor 506 by way of a wireless or wired communication link 570. The mobile communication device 516 can use a communication link 570 with a media processor 506 to send a media stream sourced from the media server 530, to send media content stored on the mobile communication device 516, or to receive media content from the media processor 506. The mobile communication device 516 can thereby provide media content according to the illustrative embodiments of method 600 of FIG. 6.

Figure 6:
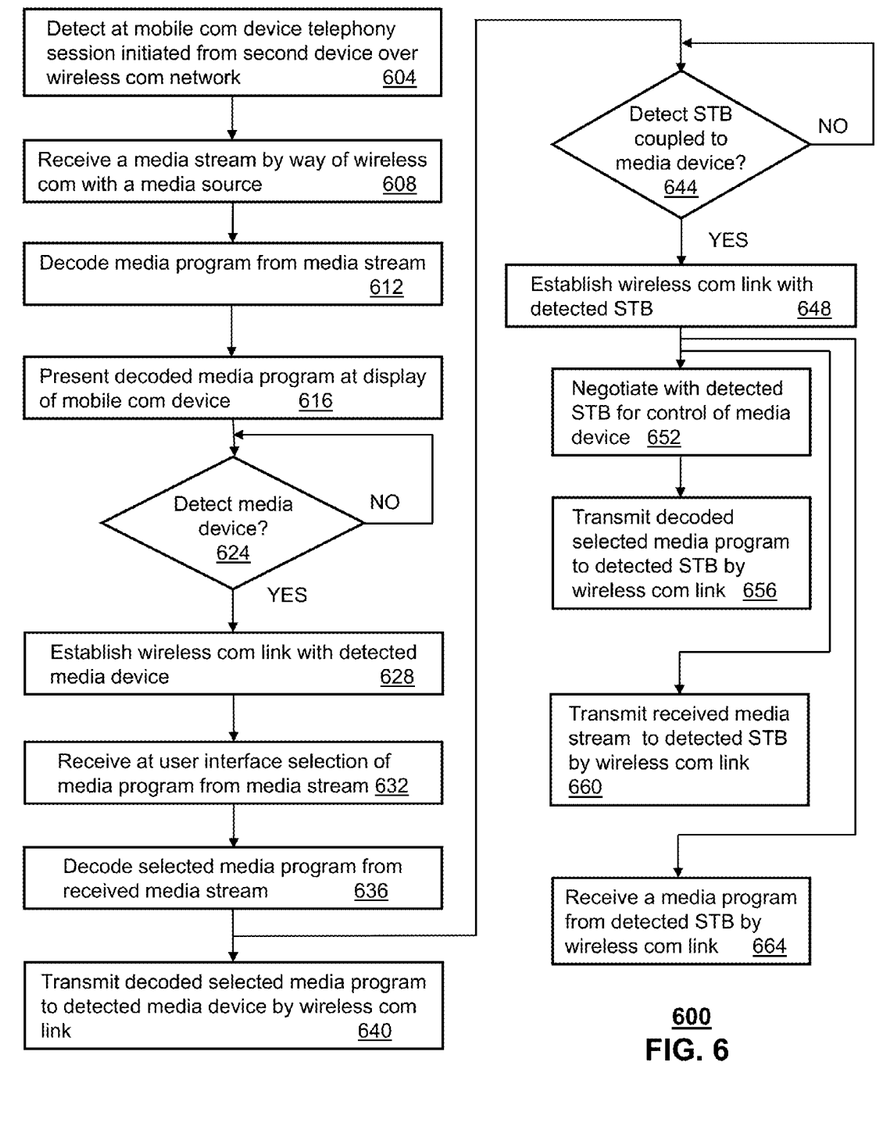
FIG. 6 depicts an illustrative embodiment of a method that can be used in portions of the communication systems described in FIGS. 1-5.

FIG. 6 depicts an illustrative method 600 that operates in portions of the devices of FIGS. 1-5. Method 600 can begin with step 604 in which the mobile communication device 516 can detect a telephony session initiated from a second device over a wireless communication link. The mobile communication device 516 can be, for example, a cellular phone, a mobile phone, a personal data assistant, a pad device, a laptop device, or a notebook device. The mobile communication device 516 can connect to a PSTN network 260 by accessing a base station 517 of a mobility network.

In step 608, the mobile communication device 516 can receive a media stream by way of a wireless communication link 545 with a media source. The media source can be a media server 530. The media stream can be transmitted from the media server 530 through the IMS network 250. From the IMS network 250, the media stream can be routed through the mobility network and base station 517 to the mobile communication device 516. The wireless communication link 545 can be a cellular link or a wireless internet protocol link. The media stream can include broadcast television programming, pay-per-view or video-on-demand programming, video, music, graphics, gaming information, and/or text.

In step 612, the mobile communication device 516 can decode a media program from the received media stream using, for example, an H.264 decoder. The mobile communication device 516 can receive an input at a user interface to select a particular program from the media stream. A graphical user interface can be presented on a display of the mobile communication device 516. For example, the mobile communication device 516 can present an electronic programming guide and can receive user selections of programming content by way of user interactions with the electronic programming guide. The mobile communication device 516 can be capable to decrypt and/or decompress the media stream to decode a particular media program from the media stream. The mobile communication device 516 can authenticate a user or the mobile communication device 516 as a valid receiver of the media stream or of particulate media programs from the media stream.

In step 616, the mobile communication device 516 can present the decoded media program at a display of the mobile communication device. The mobile communication device 516 can preset at a built-in display screen, such as a touch screen and/or liquid crystal display.

In step 624, the mobile communication device 516 can detect a presence of a media device 574. The presence can be detected by radio frequency identification (RFID). For example, the mobile communication device 516 can receive a RFID signal from a media device 574. The mobile communication device 516 can use this RFID signal to identify the media device 554 and its proximity to the mobile communication device 516. The mobile communication device 516 can detect the media device 554 by a Bluetooth signal or a WiFi signal or a femtocell signal. The detected media device 554 can be a television, a computer device, or a second mobile communication device. The mobile communication device 516 can also detect a media device 558 by a wired connection 578 of the mobile communication device 516 to the media device 558.

In step 628, the mobile communication device 516 can establish a wireless communication link 574 with the detected media device 554. The wireless communication link 574 can be a wireless access protocol such as WiFi, Bluetooth, Zigbee, or other present or next generation local or personal area wireless network technologies.

In step 632, the mobile communication device 516 can receive a user selection of a media program at a user interface of the detected media device 554. The user interface of the detected media device 554 can be a graphical user interface that can be presented on a display of the media device 554. For example, the media device 554 can present an electronic programming guide supplied by the mobile communication device 516 and can receive user selections of programming content performed at the media device 554 by way of user interactions with the electronic programming guide. The user interface can be actuated by touch screen input, button input, and/or voice command. The mobile communication device 516 can select a broadcast media program, a video-on-demand program, or a program from the media server 530 that has been previously stored on the mobile communication device 516 to satisfy the selection made at the media device 554.

In step 636, the mobile communication device 516 can decode the selected media program from the media stream received from the media server 530. The mobile communication device 516 can be capable to decrypt and/or decompress the media stream to decode a particular media program from the media stream. The mobile communication device 516 can authenticate a user or the mobile communication device 516 as a valid receiver and decoder of the media stream or of particulate media programs from the media stream.

In step 640, the mobile communication device 516 can transmit the decoded selected media program to the detected media device 554 by way of a wireless communication link 574. The mobile communications device 516 can thereby serve as a media content source or virtual set-top box for the media device 554. In one embodiment, the mobile communication device 516 can transmit the decoded selected media program to a detected media device 558 by way of a wired communication link 578. The wired and wireless communication links 574 and 578 can be high-definition multimedia interfaces. In one embodiment, the mobile communication device 516 can transcode the decoded selected media program to accommodate features or characteristics of the detected media device. For example, the media program format can be transcoded to match a resolution and screen size of the detected media device.

In step 644, the mobile communications device 516 can detect a media processor 506, such as a set-top box, that is communicatively coupled to a media device 550. The presence can be detected by radio frequency identification (RFID). For example, the mobile communication device 516 can receive a RFID signal from a media processor 506. The mobile communication device 516 can use this RFID signal to identify the media processor 506 and its proximity to the mobile communication device 516 using technology such as RSSI. The mobile communication device 516 can detect the media processor 506 by a Bluetooth signal or a WiFi signal or a femtocell signal. The mobile communication device 516 can also detect a media processor 506 by a wired connection of the mobile communication device 516 to the media processor 506.

In step 648, the mobile communications device 516 can establish a wireless communication link 570 with the detected media processor 506. The wireless communication link 570 can be a wireless access protocol such as WiFi, Bluetooth, Zigbee, or other present or next generation local or personal area wireless network technologies.

In step 652, the mobile communications device 516 can negotiate with the detected media processor 506 for control of the media device 550. In one embodiment, the mobile communications device 516 can inquire of the media processor 506 for any media device 550 that is coupled to the media processor 506. Where a media device 550 is connected to the media processor 506, the mobile communication device 516 can request permission to control the media device 550. The media processor 506 can cede control of the media device 550 to the mobile communications device 516. In one embodiment, the media processor 506 can automatically cede control of the media device 550 to the mobile communications device 516 any time the mobile communications device 516 connects to the media processor 506.

In step 656, the mobile communications device 516 can transmit the decoded selected media program to the detected media processor 506 by the wireless communication link 570. The mobile communications device 516 can thereby serve as an alternative source of media content or virtual set-top box for the media device 550. In one example, the mobile communication device 516 can have a different level of service from a service provider or can access a different service provider altogether (e.g., mobile communications device 516 receives media content from DirectTV™, while media processor 506 receives media content from Comcast™). The mobile communications device 516 can also provide media content stored on the mobile communication device 516 to the media device 550.

In step 660, the mobile communications device 516 can transmit the received media stream to the detected media processor 506 by the wireless communication link 570. The mobile communications device 516 can simply pass along media stream, received from a media server 530, to the media processor 506. The media processor 506 can thereby use the connectivity of the mobile communications device 516 to capture media content from the media server 530. In another embodiment, the media processor 506 can be operable to allow the decoded media program received from the mobile communications device 516 to be sent to the media device 550 unaltered.

In step 664, the mobile communications device 516 can receive a media program from the detected media processor 506 by the wireless communication link 570. The media processor 506 can provide broadcast media content, video-on-demand, or recorded media content to a user by way of a display of the mobile communication device 516.

Upon reviewing the aforementioned embodiments, it would be evident to an artisan with ordinary skill in the art that said embodiments can be modified, reduced, or enhanced without departing from the scope and spirit of the claims described below. In one embodiment, the mobile communication device 516 can be used as virtual satellite set-top box in a network or set-top boxes. For example, the mobile communication device 516 can be added to a network of media processors 506 and 506B made up of a master set-top box 506 and a satellite set-top box 506B. The mobile communication device 516 can share network resources with the master and satellite set-top boxes including sharing media content recorded on the master and/or satellite set-top boxes 506 and 506B, sharing media content received on the master set-top box 506, and/or sharing user set-ups, preferences, or electronic programming guide information. The mobile communication device 516 can also be used to control a media device 550B that is connected to and typically controlled by the satellite set-top box 506B.

In one embodiment, the mobile communication device 516 can receive a user selection of a media program from a graphical user interface at the mobile communication device 516 and transmit this media program to a media device 554 over a wireless communication link 574. In one embodiment, the mobile communication device 516 can control and transmit media programming to a first media device 554 by a wireless communication link 574 and to a second media device 558 by a wired communication link 578. In one or more exemplary embodiments, media content can be decoded by a mobile communication device, such as through use of a tuner located at the mobile communication device, and the decoded media content can be provided wirelessly to one or both of a set top box and a display device so that the set top box and the display device do not decode or otherwise adjust the received media content. In this example, the media content can also be provided to other communication devices wirelessly so that the recipient devices also do not decode or otherwise adjust the received media content.

Figure 7:
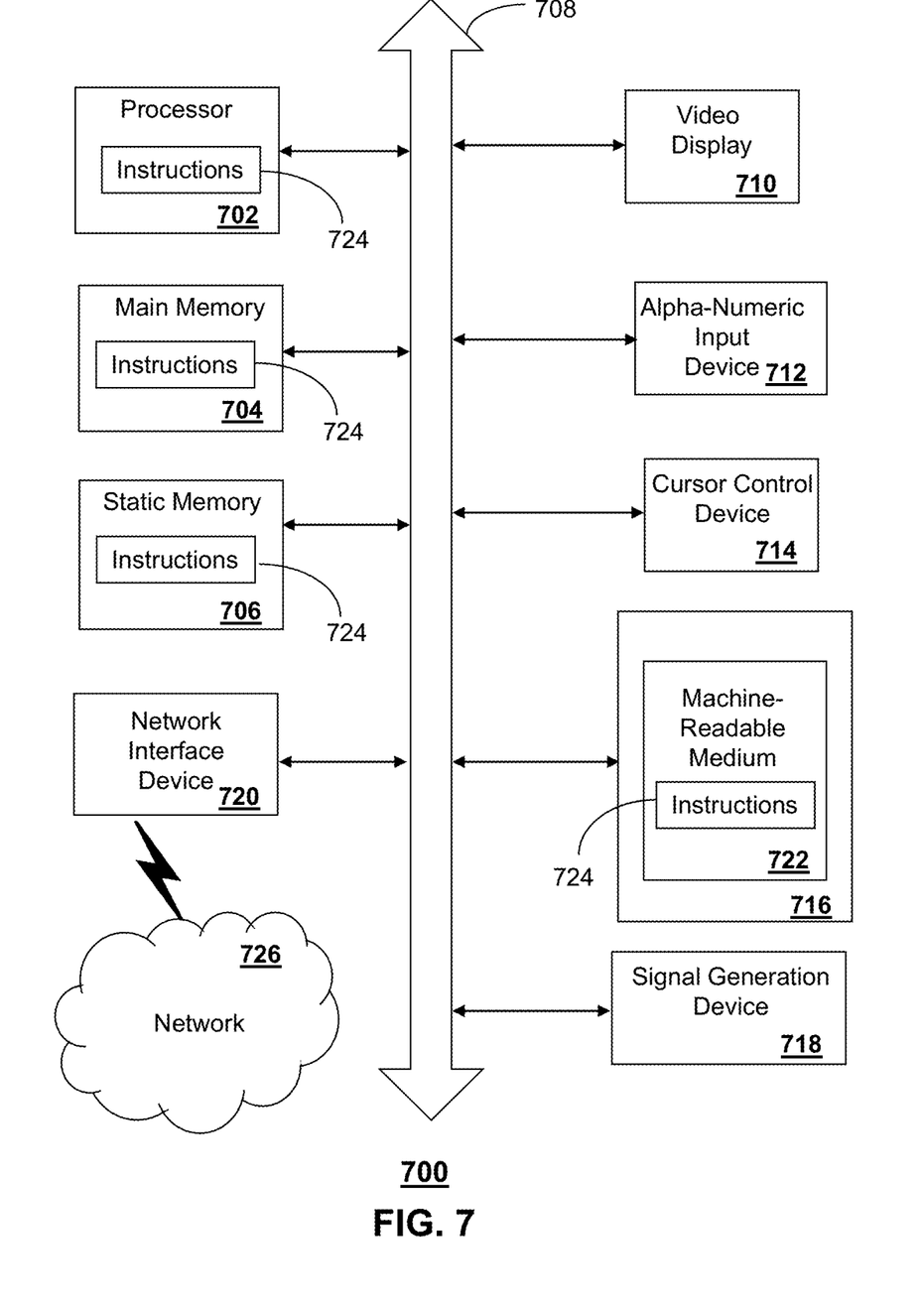
FIG. 7 is a diagrammatic representation of a machine in the form of a computer system within which a set of instructions, when executed, may cause the machine to perform any one or more of the methods discussed herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the media server device 130, the media processor 506A-C, the gateway 504A-B, the mobile communication device 516A-H, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal displays (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure. The exemplary embodiments can perform one or more of the method steps at different times and/or simultaneously.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device comprising:
a memory to store instructions;
a processor coupled to the memory, wherein the processor, responsive to executing the instructions, performs operations comprising:
receiving a first media stream comprising a first media program by way of a cellular telecommunications network;
receiving a second media stream comprising a second media program from a set-top box device by way of a first wireless communication link;
determining whether a second set-top box is communicatively coupled to a display device;
facilitating establishment of a second wireless communication link to the second set-top box responsive to detecting the second set-top box is communicatively coupled to the display device;
negotiating a transfer of operational control of the display device from the second set top box to the mobile communication device;
transmitting the first media program to the display device by way of the second set-top box using the second wireless communication link; and
transmitting the second media program to the display device by way of the second set-top box using the second wireless communication link.

2. The mobile communication device of claim 1, wherein the processor further performs operations comprising:
presenting the second media program at a built-in display of the mobile communication device.

3. The mobile communication device of claim 1, wherein the processor further performs operations comprising detecting a radio frequency identification signal from the display device.

4. The mobile communication device of claim 1, wherein the processor further performs operations comprising transcoding the first media program to accommodate a format of the display device.

5. A computer-readable storage device comprising instructions, which when executed by a processor cause the processor to perform operations comprising:
detecting at a mobile communication device a telephony communication session initiated from a second communication device over a wireless communication network;
receiving at the mobile communication device a first media stream comprising a first media program over the wireless communication network;
detecting a presence of a display device by radio frequency identification;
receiving at the mobile communication device a second media stream comprising a second media program from a set-top box by way of a second wireless communication link;
determining whether a second set-top box is communicatively coupled to a display device;
facilitating establishment of a third wireless communication link to the second set-top box responsive to detecting the second set-top box is communicatively coupled to the display device;
negotiating a transfer of operational control of the display device from the second set top box to the mobile communication device;
transmitting the first media program to the display device by way of the second set-top box using the third wireless communication link; and transmitting the second media program to the display device by way of the second set-top box using the third wireless communication link.

6. The storage device of claim 5, wherein the instructions cause the processor to perform operations comprising:
presenting the second media program at a built-in display of the mobile communication device.

7. The storage device of claim 5, wherein the instructions cause the processor to further perform operations comprising transcoding the first media program and the second media program to accommodate a format of the display device.

8. A method, comprising:
detecting, by a mobile communication device comprising a processor, a presence of a first set-top box communicatively coupled to a display device;
negotiating, by the mobile communication device, a transfer of operational control of the display device from the first set top box to the mobile communication device;
receiving, by the mobile communication device, a first media stream, by way of wireless communication with a media source;
receiving, by the mobile communication device, a second media stream from of a second set-top box; and
transmitting, by the mobile communication device, a first media program from the mobile communication device to the display device by way of a wireless communication link between the mobile communication device and the first set-top box for presentation at the display device, wherein the first media program is decoded from the first media stream; and
transmitting, by the mobile communication device, a second media program from the mobile communication device to the display device by way of the wireless communication link between the mobile communication device and the first set-top box for presentation at the display device, wherein the second media program is decoded from the second media stream.

9. The method of claim 8, comprising:
facilitating, by the mobile communication device, establishment of the wireless communication link between the mobile communication device and the first set-top box for transmission of the first media program or the second media program to the first set-top box by way of the wireless communication link.

10. The method of claim 9, wherein the presence of the first set-top box is detected with a radio frequency identification device.

11. The method of claim 8, comprising facilitating, by the mobile communication device, establishment of a wireless telephony communication session between the mobile communication device and a second communication device.

12. The method of claim 8, comprising receiving, by the mobile communication device, a third media program from the first set-top box by way of the wireless communication link.

* * * * *

UNITED STATES PATENT AND TRADEMARK OFFICE
CERTIFICATE OF CORRECTION

PATENT NO. : 9,137,559 B2
APPLICATION NO. : 13/310937
DATED : September 15, 2015
INVENTOR(S) : Sofos et al.

Page 1 of 1

It is certified that error appears in the above-identified patent and that said Letters Patent is hereby corrected as shown below:

In the claims

Claim 5 - Column 14, lines 50-51 delete

"detecting a presence of a display device by radio frequency identification;"; and Claim 8 - Column 15, line 24, delete "of".

Signed and Sealed this
Sixteenth Day of August, 2016

Michelle K. Lee
*Director of the United States Patent and Trademark Office*